(12) United States Patent  (10) Patent No.: US 9,162,846 B2
Weissbrod  (45) Date of Patent: Oct. 20, 2015

(54) SLIP LIFT CORE FOR DRUMS

(71) Applicant: Lincoln Global, Inc., City of Industry, CA (US)

(72) Inventor: Paul A. Weissbrod, South Euclid, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 279 days.

(21) Appl. No.: 14/014,922

(22) Filed: Aug. 30, 2013

(65) Prior Publication Data

US 2014/0306049 A1 Oct. 16, 2014

Related U.S. Application Data

(60) Provisional application No. 61/811,876, filed on Apr. 15, 2013.

(51) Int. Cl.
    *B65H 49/32* (2006.01)
    *B23K 9/133* (2006.01)
    *B65H 49/28* (2006.01)
    *B65H 57/18* (2006.01)

(52) U.S. Cl.
    CPC .............. *B65H 49/322* (2013.01); *B23K 9/133* (2013.01); *B65H 49/28* (2013.01); *B65H 57/18* (2013.01); *B65H 2701/36* (2013.01)

(58) Field of Classification Search
    CPC combination set(s) only.
    See application file for complete search history.

(56) References Cited

U.S. PATENT DOCUMENTS

| 3,809,333 | A | | 5/1974 | Lefever |
| 5,344,094 | A | | 9/1994 | Hoffman |
| 5,494,160 | A | | 2/1996 | Gelmetti |
| 5,746,380 | A | * | 5/1998 | Chung ......................... 242/171 |
| 6,564,943 | B2 | | 5/2003 | Barton et al. |
| 6,715,608 | B1 | | 4/2004 | Moore |
| 6,745,899 | B1 | | 6/2004 | Barton |
| 6,827,217 | B2 | | 12/2004 | Matsuguchi et al. |
| 6,857,521 | B2 | | 2/2005 | Cantu-Gonzalez |
| 6,913,145 | B2 | | 7/2005 | Barton et al. |
| 7,178,755 | B2 | | 2/2007 | Hsu et al. |
| 8,245,846 | B2 | | 8/2012 | Nicklas |
| 2004/0000498 | A1 | * | 1/2004 | Weissbrod ..................... 206/386 |
| 2005/0258290 | A1 | | 11/2005 | Kuper |
| 2006/0021893 | A1 | * | 2/2006 | Zymon ......................... 206/397 |
| 2009/0057459 | A1 | * | 3/2009 | Fabian .......................... 242/171 |
| 2011/0203948 | A1 | * | 8/2011 | Barhorst et al. .............. 206/223 |

FOREIGN PATENT DOCUMENTS

EP 2492214 A1 8/2012

OTHER PUBLICATIONS

"Pail-Pack Drum Continuous Wires for MIG Welding"; Washington Alloy Co.; http://www.weldingwire.com/applications/DocumentLibraryManager/upload/Pail-Pack%20Drum.pdf; May 10, 2013.

* cited by examiner

*Primary Examiner* — Jacob K Ackun

(74) *Attorney, Agent, or Firm* — Pearne & Gordon LLP

(57) ABSTRACT

A package for coiled welding wire includes an outer housing and a slip lift core within the outer housing. The outer housing and the slip lift core form an annular space for coiling a quantity of welding wire. The slip lift core includes a fixed core and a slip core. The slip core is capable of telescopic movement relative to the fixed core from a retracted position to an extended position. At least one of the fixed core and the slip core includes a locking mechanism integrally formed with the at least one of the fixed core and the slip core, and the locking mechanism is configured to hold the slip core in the extended position. A further example of the package for coiled welding wire can include a winding surface for the welding wire to be wound around the slip lift core in a series of turns.

19 Claims, 10 Drawing Sheets

SLIP LIFT CORE FOR DRUMS

RELATED APPLICATIONS

This application claims the benefit of U.S. Provisional Application No. 61/811,876, filed Apr. 15, 2013, the entire disclosure of which is hereby incorporated herein by reference.

BACKGROUND

1. Field of the Disclosure

The present disclosure relates to a welding wire package and more particularly to an improved core for a wound wire package, such as a multi-part fiber core within a drum container.

2. Description of Related Art

Welding wire used in high production operations, such as robotic welding stations, is provided in a package which can include hundreds of pounds of wire. The package is often a lidded drum in which a large volume of welding wire is coiled in a series of turns within the drum around a central core or a central clearance bore. During use, the volume of looped wire in the drum is decreased as the wire is paid out to a welding operation. The welding wire can become twisted and/or knotted as it is paid out, should a turn flip over the top of the central core or drag across other stored turns. This can result in unproductive down time during the welding operation. Accordingly, it would be beneficial to provide a package for welding wire that reduces the likelihood of the wire becoming twisted and/or knotted.

BRIEF SUMMARY

The following presents a simplified summary of the disclosure in order to provide a basic understanding of some example aspects of the disclosure. This summary is not an extensive overview of the disclosure. Moreover, this summary is not intended to identify critical elements of the disclosure nor delineate the scope of the disclosure. The sole purpose of the summary is to present some concepts of the disclosure in simplified form as a prelude to the more detailed description that is presented later.

In accordance with one aspect of the present disclosure, a package for coiled welding wire is provided. The package for coiled welding wire includes an outer housing and a slip lift core within the outer housing. The outer housing and the slip lift core form an annular space for coiling a quantity of welding wire. The slip lift core includes a fixed core and a slip core. The slip core is capable of telescopic movement relative to the fixed core from a retracted position to an extended position. At least one of the fixed core and the slip core includes a locking mechanism integrally formed with the at least one of the fixed core and the slip core, and the locking mechanism is configured to hold the slip core in the extended position.

In accordance with another aspect of the present disclosure, a package for coiled welding wire is provided. The package for coiled welding wire includes an outer housing and a slip lift core within the outer housing. The outer housing and the slip lift core form an annular space for coiling a quantity of welding wire. The slip lift core provides a winding surface for the welding wire to be wound around the slip lift core in a series of turns. The slip lift core comprises a fixed core and a slip core capable of telescopic movement relative to the fixed core from a retracted position to an extended position. The slip core includes a wire holding device, wherein the wire holding device applies a force to an end portion of the welding wire as the slip core is placed in the extended position, causing separation of one or more turns of the welding wire from the remaining unseparated welding wire coiled within the annular space.

In accordance with another aspect of the present disclosure, a package for coiled welding wire is provided. The package for coiled welding wire includes an outer drum. The package for coiled welding wire also includes a slip lift core within the outer drum. The outer drum and the slip lift core forming an annular space for coiling a quantity of welding wire. The slip lift core includes a fixed core and a slip core nested within the fixed core. The slip core is capable of telescopic movement relative to the fixed core, from a retracted position to an extended position. The slip lift core also includes a twist lock. The twist lock includes a tab on the slip core and an aperture defined by the fixed core for receiving the tab. The slip lift core further includes a view hole defined in the fixed core. The view hole allows the slip core to be viewed through the fixed core when the slip core is in the extended position. The slip lift core still further includes a wire holding device. The wire holding device applies a force to an end portion of the welding wire as the slip core is placed in the extended position, causing separation of one or more turns of the welding wire from the remaining unseparatred welding wire coiled within the annular space. The end portion of the welding wire within the wire holding device restricts rotational movement of the slip core relative to the fixed core when the slip core is located in the retracted position.

DETAILED DESCRIPTION

Figure 1:
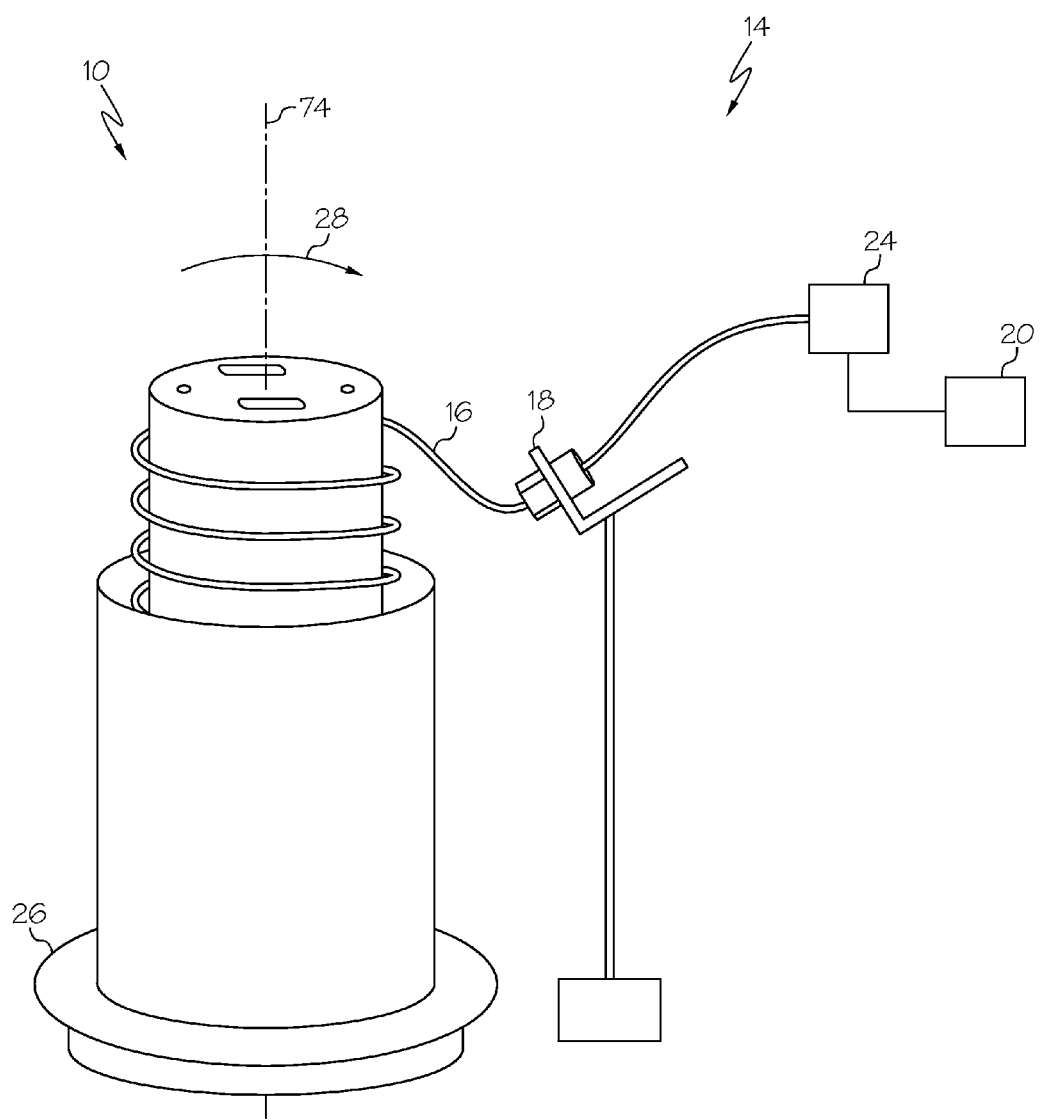
FIG. 1 is a schematic perspective view of an example package for coiled welding wire used in conjunction with a welding system.

The present disclosure relates to a welding wire package and more particularly to an improved core for a wound wire package, such as a multi-part fiber core within an outer housing such as a drum container. The present disclosure will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present disclosure. It may be evident, however, that the present invention can be practiced without these specific details. Additionally, other embodiments of the invention are possible and the described apparatus is capable of being practiced and carried out in ways other than as described. The terminology and phraseology used in describing the invention is employed for the purpose of promoting an understanding of the disclosure and should not be taken as limiting.

As used herein, the term "turn" refers to a single loop of welding wire that is coiled within an outer housing such as a storage drum. Stored welding wire can be one continuous length of wire, and as such is coiled to include many turns within the storage drum. Despite the wire being one continuous length, the coiled welding wire can include many turns, and one turn can be adjacent several other, distinct turns.

A welding wire drum can have a generally cylindrical shape, and can include welding wire stored in and paid out of the drum. The drum will typically have a closed bottom, an open top closable by a lid, and an internal diameter. In one example, a cylindrical fiber or cardboard core having an external diameter is located within the cylindrical drum. The core can be cylindrical and concentric with a central axis of the drum. The distance between the internal diameter of the drum and the external diameter of the core creates an annular space in which the wire is stored and shipped. In many examples, the wire is looped around the outside surface of the core creating multiple layers of wire, each layer including multiple turns. The wire can be looped in a manner that has a cast to facilitate wire payout with a minimum of tangles. In one example, each turn can have a calculated amount of twist added to it as the wire is coiled in order to offset the twist that is added to the wire in a typical pay-out process. Examples of welding wire that can be coiled or stored in a drum include wire for flux cored arc welding, gas metal arc welding, shielded metal arc welding, submerged arc welding, etc.

At the location of the welding operation, the top or lid of the drum is removed and is sometimes replaced with a feeding hat including a standard conduit through which the wire is pulled during the welding operation. In some examples, the drum is placed on a turntable, and the force applied to the wire as it is pulled from the drum causes the wire to tighten around the core and rotate the drum. In many cases, the drum is allowed to rotate freely as urged by the force on the pulled wire.

As the welding wire is paid out, the turn closest to being paid out from the drum tends to elevate in spiral form up the annular space to physically separate itself from the remainder of the turns. In an ideal situation, the turn lifts away from the remainder of the turns before it can be dragged across other turns in the same layer or other layers of turns. However, when the drum is relatively full, there is little distance between either the lid/top of the drum or the feeding hat and the top layer of turns. In common examples, the stored wire is coiled to within about 4-inches (about 10.2 centimeters) of the top of the drum. In this case, the turn being paid out is sometimes dragged across other turns or lodges underneath another turn. This interaction between the turn being paid out and other turns can cause knots in the wire. In one example, the knot resembles a typical clove hitch knot. Knots such as this in the wire require a stoppage in the operation of the welder while the knot is removed and the wire feed is re-established.

Another wire feed problem that sometimes stops operation of the welder includes tangles in the paid out wire. In one example, tangles occur if a turn, as it is being paid out, flips over the core prior to being paid out. This tangle immediately stops the operation of the welder, and just like the knot, must be removed and the wire feed re-established prior to re-starting the welder operation.

Both wire feed problems described above (i.e., knots and tangles) are often reduced in frequency or eliminated as the height of the stored wire decreases. In one example, the wire feed problems do not frequently occur after the height of the stored wire is reduced to about 75% of its original height. This reduction in wire feed problems is brought about by the increase in distance between the top layer of stored welding wire turns and the lid/top of the drum or the feeding hat. This increased distance enables the paid out wire to adequately lift off the top layer of stored wire before it is able to drag across other turns of welding wire. The increased distance also significantly reduces the likelihood of a turn or turns flipping over the core to create a tangle. In summary, establishing a wire path that elevates the turns in a spiral upward around the core helps reduce wire feed problems. This spiral lifts and separates the turns to help ensure that the turns do not become crossed and/or locked when the turns tighten to drive the rotation of the drum.

FIG. 1 shows an example package for coiled welding wire 10 of the present disclosure as used in a welding wire distribution arrangement, or welding system 14. As a brief summary, the welding system 14 can include various components. For example, the welding system 14 can include a supply of welding wire 16 which is shown stored within the package for coiled welding wire 10. The welding wire 16 can be removed from the package for coiled welding wire 10 and travel through a pay-off arm 18 located at a desired height which may be termed a "pick point." The welding wire 16 can then proceed for consumption at a welder 20. Any suitable style of welder 20 can be used with the apparatus of the present disclosure. An operator (not shown) can manually draw the welding wire 16 from the package for coiled welding wire 10, however, it may be more common to include a feeder 24. The feeder 24 can continuously draw the welding wire 16 from the package for coiled welding wire 10 to enable automatic or semi-automatic welding operations conducted by the welder 20. In the shown example, the package for coiled welding wire 10 is placed on a turntable 26. Any suitable turntable 26 can be used in conjunction with the package for coiled welding wire 10. In one example, the turntable 26 does not include a drive or a braking system, and is free to rotate as the welding wire 16 is paid out of the package for coiled welding wire 10. As shown in FIG. 1, the turntable 26 can be urged to rotate in a clockwise direction as represented by arrow 28, however, other orientations of the welding system 14 can include other rotation and/or movement directions.

Figure 2:
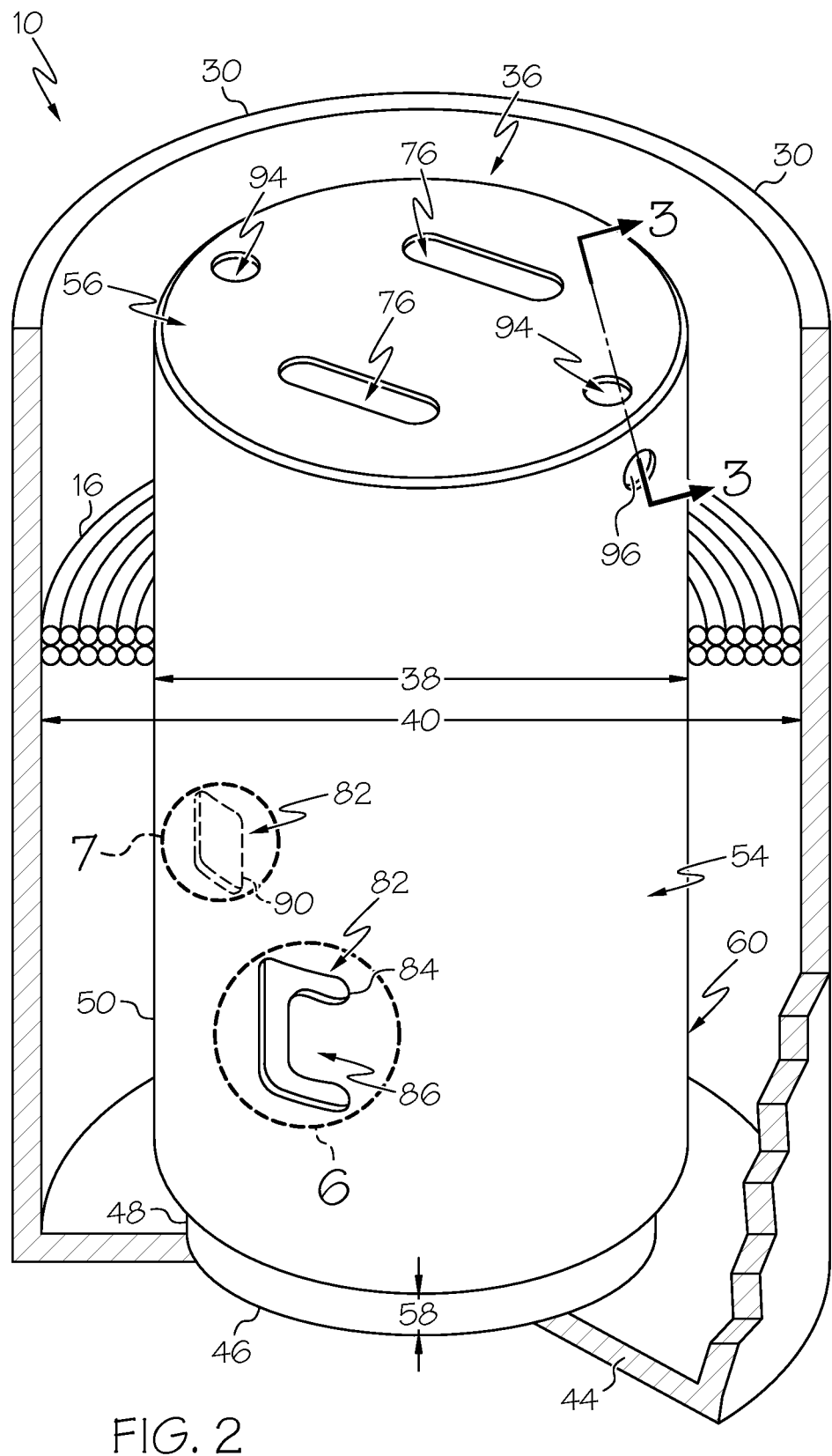
FIG. 2 is a partial cross-section of the package for coiled welding wire from FIG. 1, showing a slip core in a retracted position.

Turning to the partial cross-section view of FIG. 2, the package for coiled welding wire 10 includes an outer housing 30. The outer housing 30 can be generally cylindrical and can be constructed of materials typically used in the storage and shipment of welding wire. In one example, the outer housing 30 is a drum constructed of a fiber material. While not shown, the outer housing 30 can be chimed, that is, a top surface 34 of the outer housing 30 can include a ring constructed of metal or another relatively stiff material to facilitate attachment of a lid and promote stability of the outer housing 30.

The package for coiled welding wire 10 also includes a slip lift core 36 within the outer housing 30. In one example, the slip lift core 36 is shorter than the outer housing 30 providing clearance for a lid (not shown) to be fastened to the outer housing 30 for closing the interior space of the outer housing during shipping and storage. In another example, the slip lift core 36 is the same height as the outer housing 30, the lid fitting tightly against the slip lift core 36. In one example, the slip lift core 36 is generally cylindrical, similar to the outer housing 30. Additionally, the slip lift core 36 includes an external diameter 38 that is less than the internal diameter 40 of the outer housing 30 such that the outer housing 30 and the slip lift core 36 form an annular space for coiling a quantity of welding wire 16. It is to be appreciated that a limited number of turns of welding wire 16 (only the uppermost turns) are shown in FIG. 2, however, the welding wire 16 is typically coiled from the floor 44 of the outer housing 30 up to the level of turns shown in FIG. 2. The slip lift core 36 can be constructed of materials typically used in storage and shipment of welding wire 16. In one example, the slip lift core 36 is constructed of a fiber material, such as paper fiber or cardboard.

The slip lift core 36 includes at least two portions that compose the slip lift core 36. The slip lift core 36 includes a fixed core 46 which is attached to the floor 44 of the outer housing 30. The fixed core 46 can be attached to the floor 44 of the outer housing 30 by any suitable attachment method. In one example, the fixed core 46 is glued to the floor 44 of the outer housing 30. The fixed core 46 can include a substantially cylindrical wall 48, (best viewed in FIG. 3), and may or may not include a top surface.

The slip lift core 36 also includes a slip core 50. The slip core 50 can be constructed of materials similar to that of the fixed core 46 such as paper fiber or cardboard. The slip core 50 includes a substantially cylindrical wall 54 (best viewed in FIG. 3), a top 56, and does not include a base. In one example, the top 56 and the cylindrical wall 54 are formed by one unitary piece. In another example, the top 56 and the cylindrical wall 54 are constructed separately and attached to each other. The slip core 50 can be shorter in height than the fixed core 46 as shown by distance 58 in FIG. 1. However, it can be beneficial to have slip core 50 approximately the same height as the fixed core 46. In other examples, the slip lift core 36 can include more than two core sections. Additionally, the slip lift core 36 can provide a winding surface 60 for the welding wire 16 to be wound around the slip lift core 36 in a series of turns.

Figure 3:
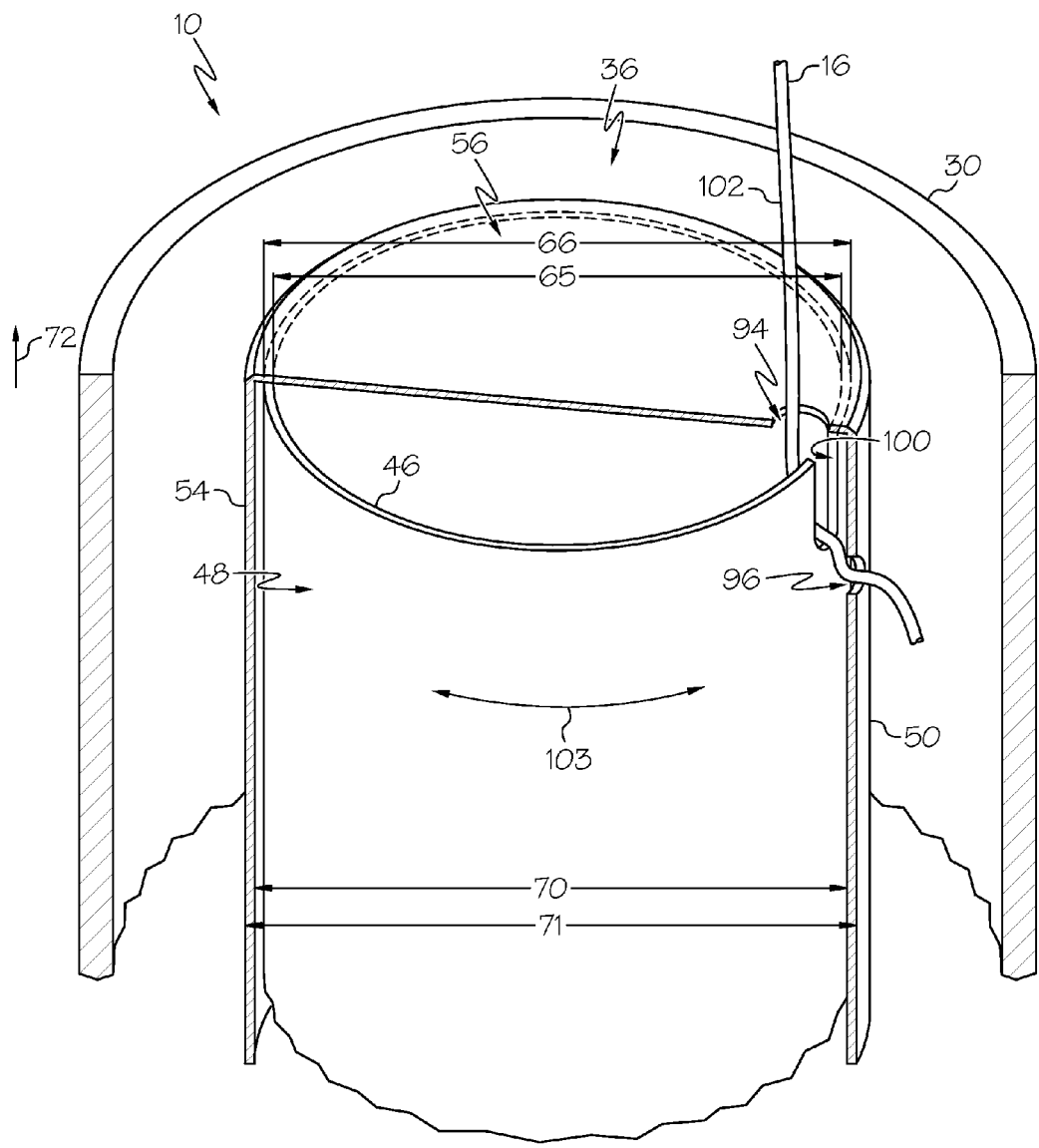
FIG. 3 is a partial cross-section schematic taken along line 3-3 of FIG. 2.

Turning to FIG. 3, the upper portion of the slip lift core 36 is shown in partial cross-section. As shown, the fixed core 46 has a generally cylindrical shape including a fixed core internal diameter 65 and a fixed core external diameter 66. The slip core 50 has a generally cylindrical shape including a slip core internal diameter 70 and a slip core external diameter 71. The selection of the fixed core internal diameter 65, the fixed core external diameter 66, the slip core internal diameter 70 and the slip core external diameter 71 enable the slip core 50 to telescopically move in a substantially vertical direction (represented by arrow 72) relative to the fixed core 46. In the shown examples of FIGS. 2, 3, 4, and 5, the slip core internal diameter 70 is greater than the fixed core external diameter 66 such that the slip core 50 can telescopically move around the exterior of the fixed core 46.

Figure 4:
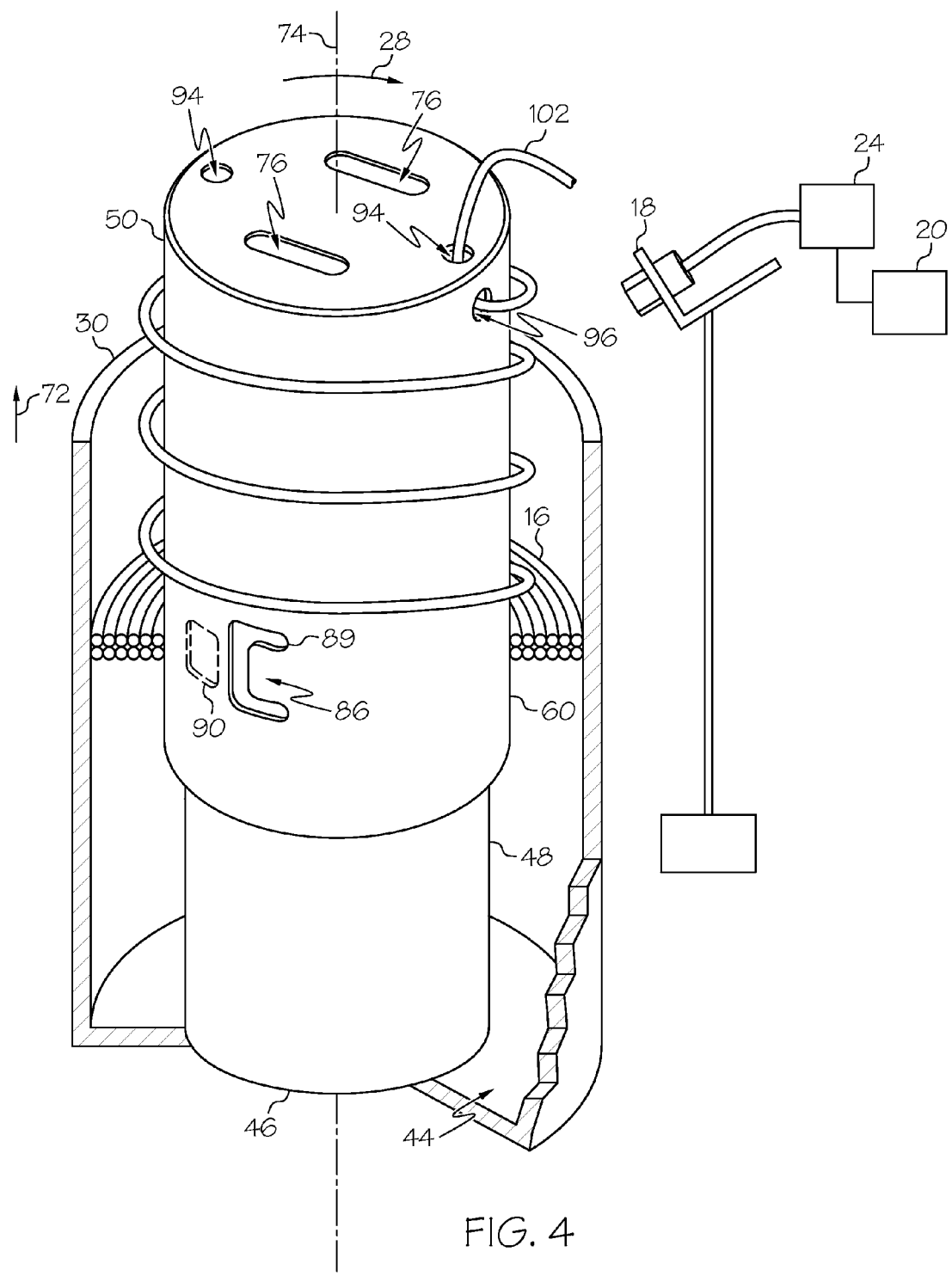
FIG. 4 is a partial cross-section showing the slip core in an extended and unlocked position.

As such, the slip lift core 36 can be moved from a retracted position as shown in FIG. 2 to an extended position as shown in FIG. 4. The retracted position of the slip core 50 as shown in FIG. 2 can be termed a "nested" position. In the retracted position, the slip core 50 generally covers the majority of the fixed core 46 by sliding over the fixed core 46 such that the fixed core 46 is nested within the slip core 50. As shown in FIGS. 1 and 4, the slip core 50 and the fixed core 46 are arranged coaxially along an axis 74 such that the telescopic movement of the slip core 50 occurs along the axis 74.

As shown in FIG. 4, the slip core 50 can define a number of apertures such as one or more lift apertures 76. The lift apertures 76 can be configured to enable an operator's hands or any other lifting apparatus to be placed through the lift apertures 76 and maneuver the slip core 50 (e.g., lift the slip core 50 to the extended position as shown in FIG. 4). The lift apertures 76 can be formed in any number of suitable shapes and can be located symmetrically from the center point of the top 56. Furthermore, the lift apertures 76 can be located in the top 56 of the slip core 50 as shown, but other locations are also contemplated.

Figure 5:
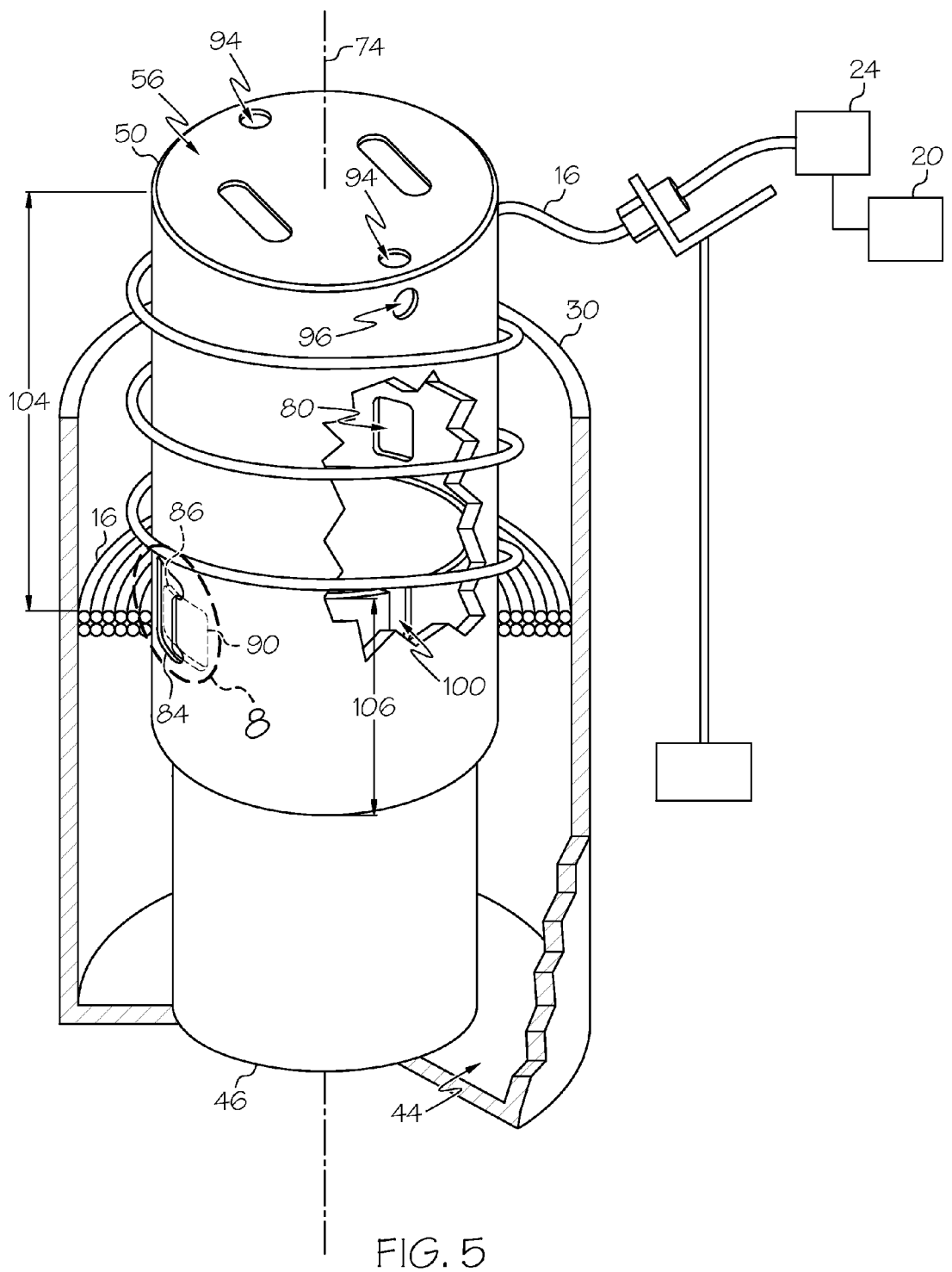
FIG. 5 is a partial cross-section showing the slip core in an extended and locked position.

One of the slip core 50 and the fixed core 46 defines a view hole 80 that allows the other of the slip core 50 and the fixed core 46 to be viewed through the view hole 80 when the slip core 50 is in the extended position. Turning to FIG. 5, the slip core 50 can define at least one view hole 80 that allows the fixed core 46 to be viewed through the slip core 50 when the slip core 50 is in the extended position. A view of the fixed core 46 enables an operator to determine if the slip core 50 is raised to a predetermined height (e.g., the extended position). The location and size of the view hole 80 can be selected in order to create a convenient orientation relationship between the view hole 80 and one or more features of the fixed core 46. For example, by observing the relative height of the slip core 50 to the fixed core 46 through the view hole 80, the operator can elevate the slip core 50 to the predetermined extended position. In one example, the operator can raise the slip core 50 to the desired height by lifting the slip core 50 until the bottom of the view hole 80 is at or near the same elevation as the top of the fixed core 46, as shown in FIG. 5. This position can be determined by the operator simply by looking through the view hole 80. In another example, the view hole 80 can enable an operator to view a horizontal marking on the fixed core 46 and match that marking with a marking on the slip core 50, such as an arrow or a line. In yet another example, the view hole 80 can enable the operator to align the view hole 80 with a target shape located on the fixed core 46 which places the slip core 50 in the desired extended position.

Figure 6:
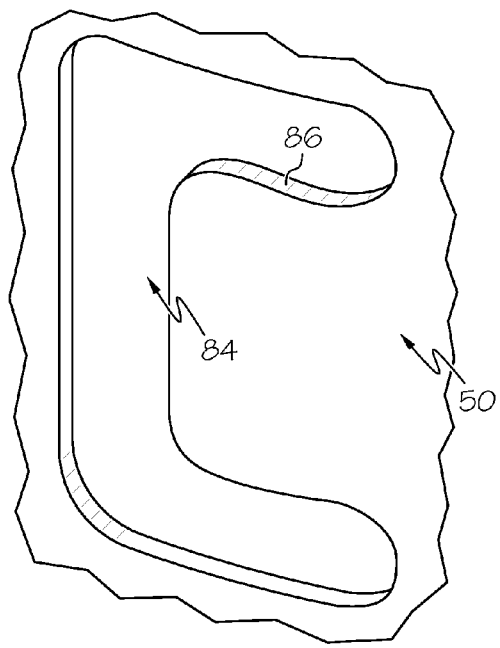
FIG. 6 is a detail perspective view of a "U"-shaped aperture on the slip core of FIG. 2.

Returning to FIG. 2, the slip lift core 36 includes a locking mechanism such as the twist locking mechanism 82 integrally formed with at least one of the fixed core 46 and the slip core 50. The twist locking mechanism 82 is configured to hold the slip core 50 in the extended position. In one example, the cylindrical wall 54 of the slip core 50 defines an aperture. One such aperture is a "U"-shaped aperture 84 which can be located within the lower half of the cylindrical wall 54, although other locations are also contemplated. The "U"-shaped aperture 84 defines a tab 86 (e.g., a cantilevered tab) which, due to its attachment to the slip core 50 on only one side, is at least somewhat flexible, and can be urged toward the interior of the slip core 50. A detail view of the "U"-shaped aperture 84 is shown in FIG. 6.

Figure 7:
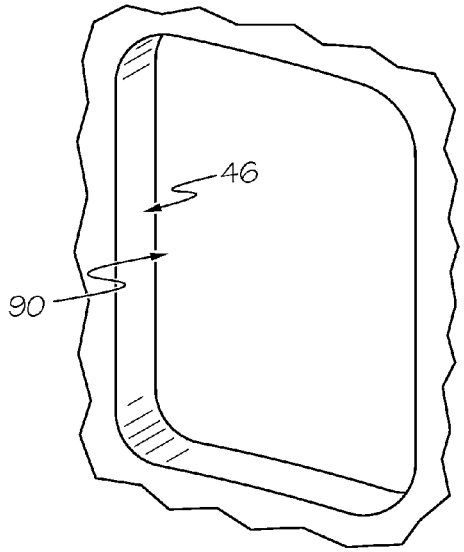
FIG. 7 is a detail perspective view of an aperture on the fixed core of FIG. 2.

The twist locking mechanism 82 can also include an aperture 90 defined by the cylindrical wall 48 of the fixed core 46, indicated by the dashed lines in FIG. 2, and shown in greater detail in FIG. 7. When the slip lift core is in the retracted position, the aperture 90 is located at a higher elevation and at an angular position away from the "U"-shaped aperture 84. After the operator has raised the slip core 50 to the extended position elevation as described above and as shown in FIG. 4, the aperture 90 and the "U"-shaped aperture 84 are located at the same elevation.

Figure 8:
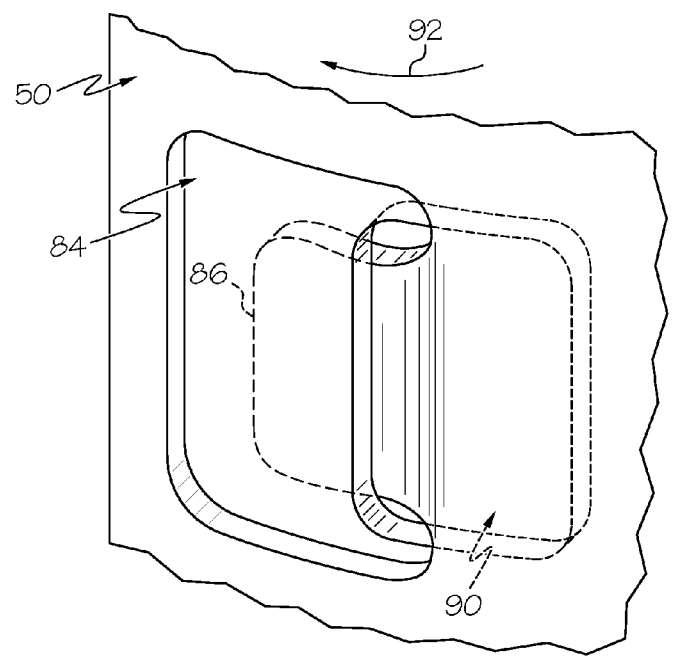
FIG. 8 is a detail perspective view of a twist locking mechanism.

At that time, in order to hold or lock the slip core 50 in the extended position, the operator can place a first hand into the view hole 80 (best seen in FIG. 5) and rotate the elevated slip core 50 until the "U"-shaped aperture 84 is aligned with the aperture 90. When the U-shaped aperture 84 is aligned with aperture 90, the operator can then depress the tab 86 defined by the "U"-shaped aperture 84 with his second hand. The operator depresses the tab 86 while urging rotation of the slip core 50 in a clockwise rotation as indicated by arrow 92 in FIG. 8. The slip core 50 is rotated around the axis 74 during the twist lock operation.

Depressing the tab 86 during rotation (i.e., the twist lock operation) inserts the tab 86 into the aperture 90 defined in the cylindrical wall 48 of the fixed core 46 and the tab 86 is moved to an interior portion of the fixed core 46 as shown in FIG. 5. This arrangement locks the slip core 50 in the extended position with respect to the fixed core 46 by creating a physical interference to vertical movement between the fixed core 46 and the slip core 50. For example, the tab 86 located on the slip core 50 passes through the aperture 90 in the fixed core 46. As such, the slip core 50 cannot be moved to a lower elevation (e.g., the retracted position) without first removing the tab 86 from the aperture 90.

Additionally, the twist locking mechanism 82 is configured to prevent at least one of clockwise and counterclockwise rotation of the slip core 50 relative to the fixed core 46 when the slip core 50 is locked in the extended position as shown in FIG. 5. Specifically, the twist locking mechanism 82 prevents rotation of the slip core 50 relative to the fixed core 46 in the rotational direction in which the tab 86 points. In one example, the tab 86 points in the clockwise direction (when viewed from above), thus preventing rotation of the slip core 50 in the clockwise direction when the slip core 50 is locked in the extended position. In another specific example, the tab 86 is arranged to point in the payout direction of the welding wire 16. This arrangement results in the welding wire payout action urging the tab 86 toward the aperture 90, helping to assure the twist locking mechanism 82 remains in a locked position during welding operations.

The above described twist lock operation creates a physical interference to rotational movement in the clockwise direction between the fixed core 46 and the slip core 50. For example, the tab 86 located on the slip core 50 passes through the aperture 90 in the fixed core 46. As is shown in the detail view of FIG. 8, the right-most points of the "U"-shaped aperture 84 come into contact with the left-most portion of the aperture 90, preventing further rotational movement as represented by arrow 92. As such, the slip core 50 cannot be further rotated clockwise relative to the fixed core 46 without first removing the tab 86 from the aperture 90. Beneficially, paying out the welding wire 16 as shown in FIG. 5 urges the slip core 50 and the package for coiled welding wire 10 in a clockwise direction, thereby assisting in locking the slip core 50 into place with the twist locking mechanism 82. It is to be appreciated that the twist locking mechanism 82 can lock the slip core 50 in place both vertically and rotationally with respect to the fixed core 46. Further, the described twist locking mechanism is but one example of a locking mechanism, and any suitable locking mechanism can be used with the present disclosure. Moreover, the tab could be located on the fixed core instead of the slip core, to be received in a corresponding aperture in the slip core. In certain embodiments, the tab extends downwards or upwards instead of to the side as shown.

The slip core 50 can further include a wire holding device. In one example, the wire holding device can simply be a hole such as a first welding wire aperture 94 located in the top 56 of the slip core 50. After being coiled into the annular space, one end of the welding wire 16 can be inserted into the first welding wire aperture 94. In another example, the slip core 50 defines the first welding wire aperture 94 and a second welding wire aperture 96 and the fixed core 46 defines a welding wire slot 100 as shown in FIG. 3. Each of the first welding wire aperture 94, the second welding wire aperture 96, and the welding wire slot 100 are configured to enable an end portion 102 of the welding wire 16 to pass through the first welding wire aperture 94, the second welding wire aperture 96, and the welding wire slot 100 as shown in FIG. 3. The presence of the welding wire 16 passing through the first welding wire aperture 94, the second welding wire aperture 96, and the welding wire slot 100 which are located alternately on the slip core 50 and the fixed core 46, creates a physical interference to rotational movement as indicated by arrow 103. As such, the location of the welding wire 16 as shown in FIG. 3 restricts rotational movement 103 of the slip core 50 relative to the fixed core 46 when the slip core 50 is located in the retracted position as shown in FIGS. 2 and 3. In this arrangement, the slip core 50 can be said to be "clocked," or located in a fixed angular location with respect to the fixed core 46 during shipping and storage. The slip core 50 can define multiple first welding wire apertures 94 and second welding wire apertures 96 as shown in FIG. 4. Additionally, the fixed core 46 can define at least one welding wire slot 100 as shown in FIG. 5 corresponding to the first welding wire apertures 94 and second welding wire apertures 96. In one example, these structures are located at diametrically opposed positions on the slip core 50 and the fixed core 46. As shown in FIG. 4, the end portion 102 of welding wire 16 can be bent over and down to help prevent the welding wire 16 from withdrawing from the first welding wire aperture 94, the second welding wire aperture 96, and the welding wire slot 100 during shipping and storage.

The wire holding device applies a force to the end portion 102 of the welding wire 16 as the slip core 50 is placed in the extended position shown in FIG. 4. The force is in the direction of arrow 72 and causes separation of one or more turns of the welding wire 16 from the remaining unseparated welding wire coiled within the annular space. In FIG. 4, approximately three turns of welding wire 16 are elevated and separated from the remaining unseparated welding wire 16 due to raising the slip core 50. It is to be appreciated that the number of turns of welding wire 16 elevated can vary. Additionally, placing the slip core 50 in the extended position thus applies a force to the end portion 102 and raises the end portion 102 of the welding wire 16 out of the welding wire slot 100 (best seen in FIG. 3), enabling the slip core 50 to rotate with respect to the fixed core 46 to operate the twist locking mechanism 82 as described above.

Figure 9:
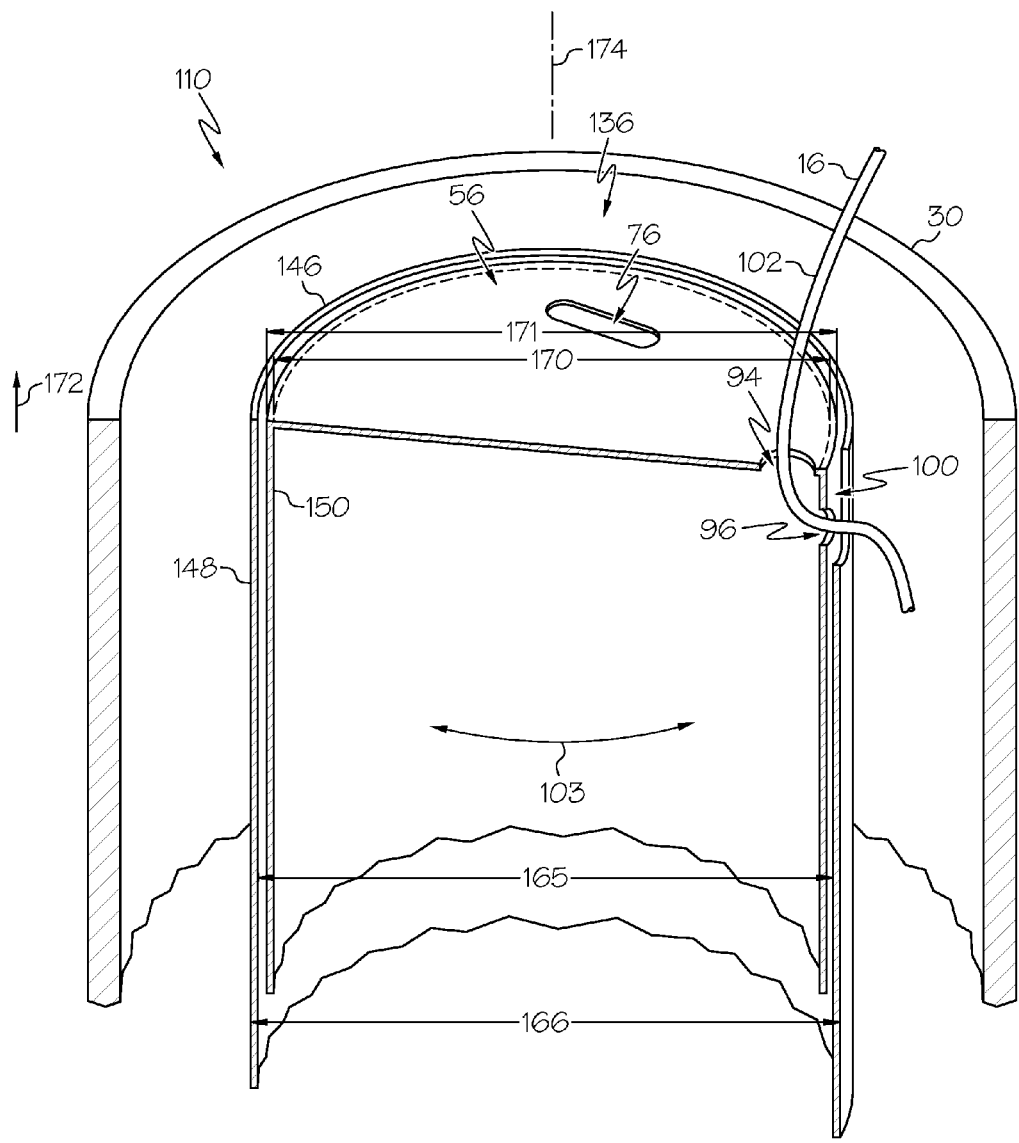
FIG. 9 is a partial cross-section schematic, showing a second embodiment of the example package for coiled welding wire.
Figure 10:
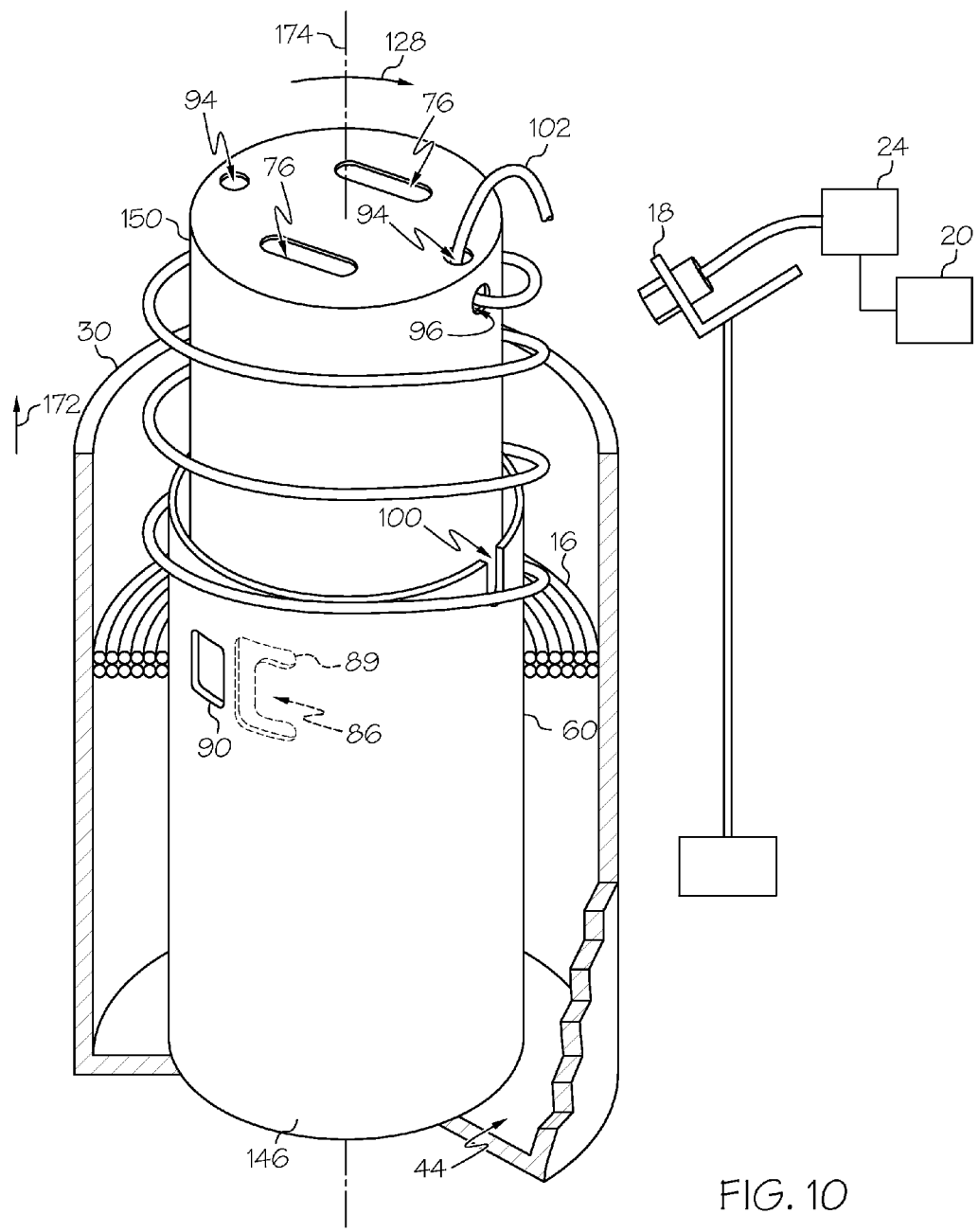
FIG. 10 is a partial cross-section showing the slip core in an extended and unlocked position.

To this point, the disclosure has focused on one embodiment of the package for coiled welding wire 10 including a fixed core 46 that is nested within a slip core 50. Turning to the partial cross-section view of FIG. 9, a second embodiment of a package for coiled welding wire 110 will be discussed in which the fixed core 146 is exterior to the slip core 150. Many features are the same as the first embodiment, and the focus of discussion will be on the differences between the two embodiments. As shown in FIG. 9, a fixed core 146 includes a fixed core internal diameter 165 and a fixed core external diameter 166. A slip core 150 includes a slip core internal diameter 170 and a slip core external diameter 171. In the shown examples of FIGS. 9, 10, and 11, the slip core external diameter 171 is less than the fixed core internal diameter 165 such that the slip core 150 can telescopically move within the interior of the fixed core 146 in a substantially vertical direction represented by arrow 172. As such, the slip lift core 136 can be moved from a retracted position as shown in FIG. 9 to an extended position as shown in FIG. 10. The slip core 150 and the fixed core 146 are arranged coaxially along an axis 174 such that the telescopic movement of the slip core 150 occurs along the axis 174.

Figure 11:
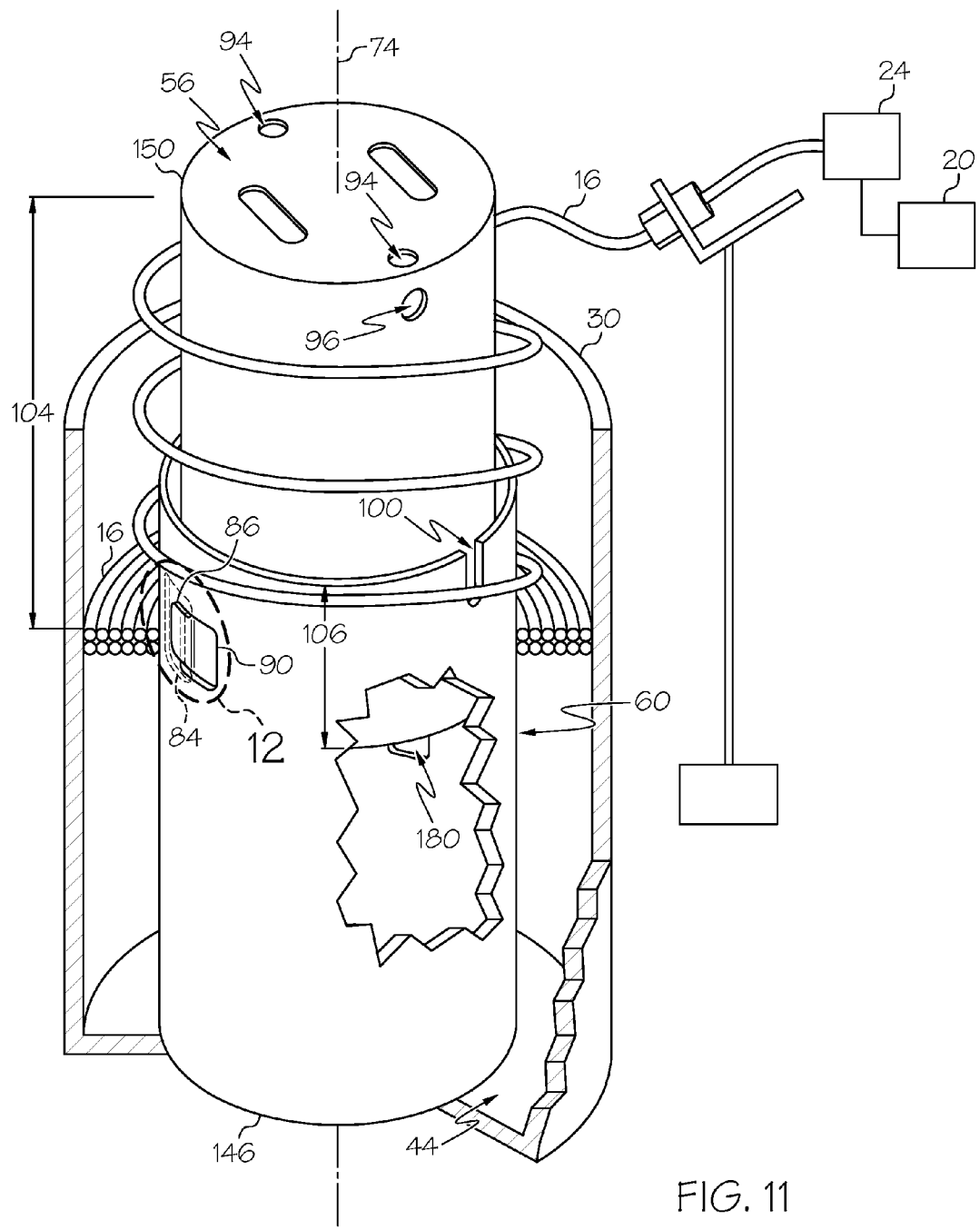
FIG. 11 is a partial cross-section showing the slip core in an extended and locked position.

Turning to FIG. 11, the fixed core 146 can define at least one view hole 180 that allows the slip core 150 to be viewed through the fixed core 146 when the slip core 150 is in the extended position. The operator can elevate the slip core 150 to the extended position by raising the slip core 150 to the desired height by lifting the slip core 150 until the bottom of the slip core 150 is at the same elevation as the top of the view hole 180 as shown in FIG. 11. In another example, the slip core 150 can be raised until a particular marking located on the slip core 150 becomes viewable.

Figure 12:
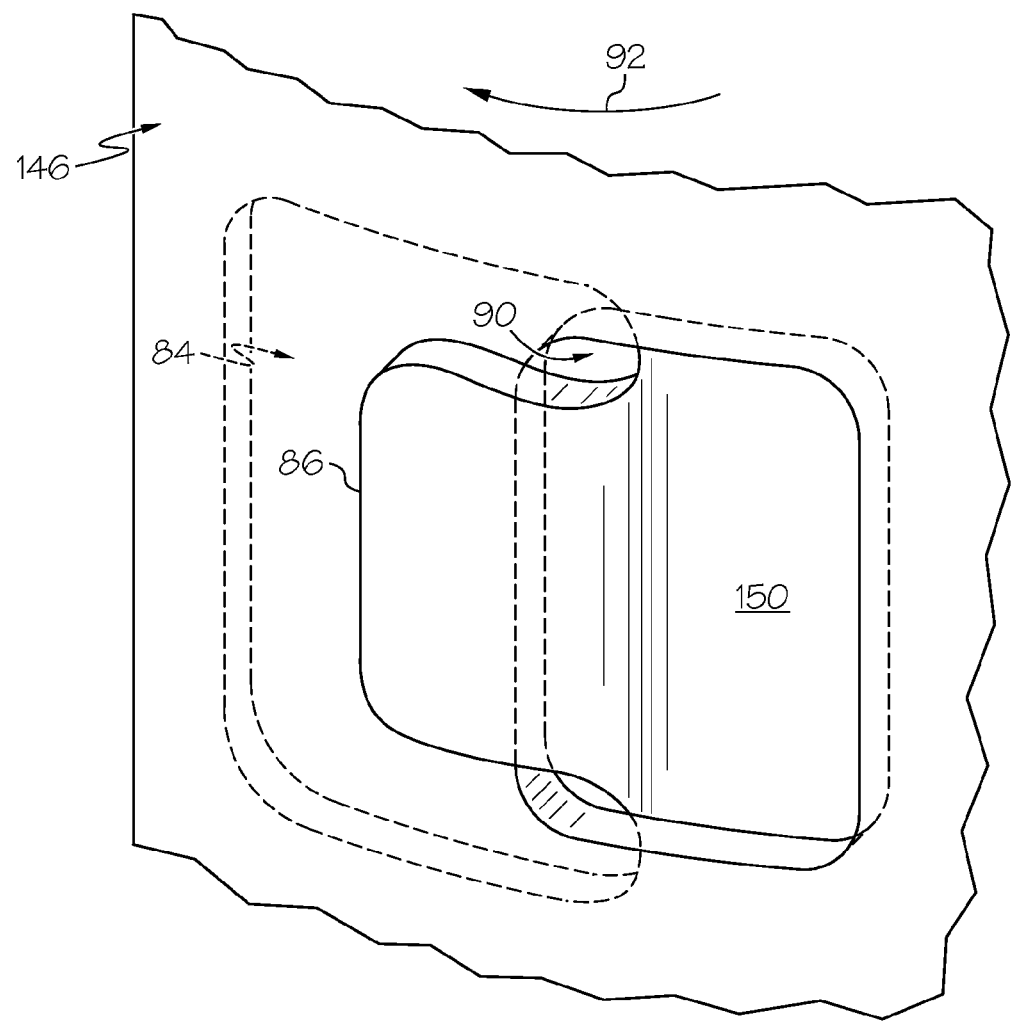
FIG. 12 is a detail perspective view of a twist locking mechanism.

During the twist lock operation for the second embodiment, the operator can place an arm into the slip core 150 through one of the lift apertures 76 and push the tab 86 outward while urging rotation of the slip core 150 in a clockwise rotation as indicated by arrow 92 in FIG. 12. Pushing tab 86 outward from the interior of the slip core 150 during rotation inserts the tab 86 into the aperture 90 defined in the cylindrical wall 148 of the fixed core 146, and the tab 86 is moved to an exterior portion of the fixed core 146 as shown in FIG. 11. FIG. 12 shows a detail of the tab 86 interacting with the aperture 90 to lock the slip core 150 in the extended position.

In the example shown in FIG. 9, the wire holding device can simply be a hole such as a first welding wire aperture 94 located in the top 56 of the slip core 150. In another example, the slip core 150 defines the first welding wire aperture 94 and a second welding wire aperture 96 and the fixed core 146 defines a welding wire slot 100 as shown in FIG. 9. After being coiled into the annular space, one end of the welding wire 16 can be passed through the welding wire slot 100 and then through the first welding wire aperture 94 and the second welding wire aperture 96.

The remainder of the description applies to both embodiments of the present disclosure unless otherwise noted. During assembly of the package for coiled welding wire 10, 110 including the slip lift core 36, 136, the fixed core 46, 146 is glued to the base of the outer housing 30 and the slip core 50, 150 is slid into position relative to the fixed core 46, 146. The slip core 50, 150 can be nested with the fixed core 46, 146 for a particular orientation between them. For example, the first welding wire aperture 94 and the second welding wire aperture 96 of the slip core 50, 150 are aligned with the welding wire slot 100 of the fixed core 46, 146 as shown in FIGS. 3 and 9. In one particular example, a substantially straight line could be drawn through the first welding wire aperture 94 and the second welding wire aperture 96 in the slip core 50, 150 and the welding wire slot 100 in the fixed core 46, 146. In this same example, when the two core sections 46, 146, 50, 150 are telescoped together, the "U"-shaped aperture 84 of the slip core 50, 150 is located lower than and at a position at least a few degrees away from the aperture 90 defined by the fixed core 46, 146 as shown in FIGS. 4 and 10.

The internal diameter of the outer housing 30 and the cylindrical wall 48, 148 of the fixed core 46, 146 can be cylindrical and concentric with central axis 74, 174 of the outer housing 30. The distance between an inside surface of the outer housing 30 and the winding surface 60 of the slip lift core 36 creates an annular space into which the welding wire 16 can be wound, creating multiple layers of turns of welding wire 16. After the desired amount (e.g., length, weight, layered height, etc.) of welding wire 16 is wound into the annular space, the end portion 102 of the welding wire 16 can be threaded through the welding wire slot 100 in the fixed core 46, 146, the second welding wire aperture 96, and the first welding wire aperture 94. This threading action helps elevate at least one turn of the welding wire 16 away from the remainder of turns in the annular space. Additionally, this threading action "clocks" the core sections 46, 146, 50, 150 such that the slip core 50, 150 cannot rotate relative to the fixed core 46, 146 during storage, shipping, etc. In other words, the welding wire 16 can act as a cotter key or shaft key to prevent rotation of the core sections 46, 146, 50 150 relative to one another. If so desired, a lid (not shown) can be added to the outer housing 30 for storage and shipping.

When the package for coiled welding wire 10, 110 is located at a welding system 14 and is prepared for paying out the welding wire 16, the lid can be removed. Upon removal of the lid, an operator will find that the end portion 102 of the welding wire 16 is readily presented. The slip core 50, 150 can then be adjusted from the retracted position of FIGS. 2, 9 to the extended position shown in FIGS. 4, 5, 10, and 11. In order to do this, an operator applies an upward force to the slip core 50, 150. In one example, such as the first embodiment, the welding wire 16 is not tightly wrapped around the slip core 50, and the operator can elevate the slip core 50 by placing his or her hands into the lift apertures 76 and pulling the slip core 50 upwards. In the second embodiment, the slip core 150 has fewer impediments to vertical travel as the welding wire 16 is wound around the fixed core 146, and the welding wire 16 can be wound around the slip lift core 36 more tightly. After the slip core 50, 150 is placed in the extended position, the operator can remove the welding wire 16 from the first welding wire aperture 94 and the second welding wire aperture 96, placing the welding wire 16 in the proper location for the start of welding. In another example, it is possible to remove the welding wire 16 from the first welding wire aperture 94 and the second welding wire aperture 96 prior to moving the slip core 50 from the retracted position of FIGS. 2, 9 to the extended position shown in FIGS. 4, 5, 10, and 11.

In one example, when the slip core 50, 150 is located in the extended position as shown in FIGS. 4, 5, 10, and 11, the top 56 of the slip core 50, 150 is located significantly higher than the highest welding wire turn included in the remaining unseparated welding wire coiled within the annular space as represented by distance 104 in FIGS. 5 and 11. In one example, the top 56 of the slip core is located at least 10-inches (25.4 centimeters) higher than a highest welding wire turn included in the remaining unseparated welding wire 16 coiled within the annular space. As such, the point at which the welding wire 16 leaves the outer housing 30 and the slip lift core 36, 136 as it is paid out is significantly higher than the topmost layer of the non-elevated or unseparated turns remaining in the annular space. The length of distance 104 can be selected based upon test results which indicate a minimum distance after which the welding wire 16 looping over the slip core 50, 150 is eliminated or significantly reduced, thereby enabling welding wire pay out with little or no supervision in an automatic or semi-automatic welding operation.

The point of departure for the welding wire 16 can be termed a "pick point." The increased distance (i.e., elevation) between the pick point and the turns of welding wire 16 in the annular space pulls at least one turn, and possibly several turns up from the layers of stored turns of welding wire 16 in a beneficial spiral pattern as previously described. In this position, the welding wire 16 is prepared to be paid out in a smooth manner with a reduced number of wire kinks, tangles, and/or knots reducing the number of welding stoppages due to these wire feed problems. In one example, the welding wire 16 is paid out in a clockwise direction.

Returning to FIG. 1, it is to be appreciated that the number of turns of welding wire 16 that are elevated up the slip lift core 36 prior to being paid out can vary during normal operation. Typically, there is no braking system on the turntable 26. As such, inertia can maintain the package for coiled welding wire 10 and the turntable 26 in free rotation even after the feeder 24 stops pulling welding wire 16 and tension forces on the welding wire 16 decrease. The lack of tension can result in elevated turns of welding wire 16 dropping back down the slip lift core 36 to re-join the remaining turns of coiled welding wire 16. As the feeder 24 begins operation again, tension is increased in the welding wire 16. In one example, three elevated turns of welding wire 16 tighten around the slip lift core 36 before there is enough torque on the slip lift core 36 to overcome inertia and minor frictional losses, starting the package for coiled welding wire 10 turning again. As a result, normal operation of the package for coiled welding wire 10 can include times when there are more than three elevated turns located on the slip lift core 36, while at other times there are fewer than three elevated turns located on the slip lift core 36. In another example, the pay out of welding wire can achieve a "steady-state" operation where a particular number of turns (e.g., three) remain elevated above the remaining turns of welding wire 16 in the annular space during a continuous welding operation.

As noted previously, the slip core 50, 150 can have approximately the same height as the fixed core 46 to promote stability and support of the slip core 50, 150 when it is placed in the extended position. For example, the greater the length of interaction between the slip core 50, 150 and the fixed core 46, 146 while the slip core 50, 150 is in the extended position, the greater the anticipated stability of the slip core 50, 150. In one particular example, the height of the outer housing 30 can be about 30-inches (about 76.2 centimeters). The height of the slip lift core 36, 136 can also be about 30-inches (about 76.2 centimeters). The slip core 50, 150 can be lifted about 18-inches (about 45.7 centimeters) from the retracted position shown in FIGS. 2 and 9 to the extended position shown in FIGS. 4, 5, 10, and 11. The 18-inch (45.7 centimeter) lift distance results in about a 12-inch (about 30.5 centimeters) long section of the slip core 50, 150 remaining engaged with the fixed core 46, 146 as represented by distance 106 in FIGS. 5 and 11. This lift distance and engagement distance were selected to maximize both the height over which one turn had to loop to cause a welding wire feed problem and the amount of support for the slip core 50, 150 in the extended position while remaining within a desired 30-inch (76.2 centimeter) shipping envelope design height. It is to be appreciated that a multitude of suitable height dimensions can be chosen.

The described package for coiled welding wire 10, 110 can reduce and/or eliminate kinks, tangles, and knots in the welding wire 16 during a welding operation which can lead to reduced down time. The package for coiled welding wire 10, 110 can accomplish this in a number of ways. The elevation increase in the extended position of the slip core 50, 150 can reduce and/or eliminate the possibility of a turn looping over the slip lift core 36, 136, which could cause a knot in the welding wire 16. This difference in elevation between the top 56 of the slip core 50, 150 in the extended position and the top layer of turns stored within the annular space promotes proper spiraling of the welding wire 16 and pulls a number of turns off the stack of stored turns in the annular space. Because a number of turns of welding wire 16 are lifted above the stored turns in the annular space, the welding wire 16 being fed to the welding operation can be less likely to drag across stored layers of welding wire 16, which can tangle the welding wire 16. As such, the described increase in elevation or distance can reduce down time from stoppages due to welding wire kinks, tangles, knots, and other welding wire feed problems.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A package for coiled welding wire comprising:
an outer housing; and
a slip lift core within the outer housing, the outer housing and the slip lift core forming an annular space for coiling a quantity of welding wire,
wherein the slip lift core comprises a fixed core and a slip core capable of telescopic movement relative to the fixed core, from a retracted position to an extended position, and
wherein at least one of the fixed core and the slip core comprises a locking mechanism integrally formed with the at least one of the fixed core and the slip core, and wherein the locking mechanism is configured to hold the slip core in the extended position.

2. The package for coiled welding wire according to claim 1, wherein the locking mechanism is a twist locking mechanism, and the slip core and the fixed core are arranged coaxially along an axis such that the telescopic movement of the slip core occurs along the axis, and the slip core is rotated around the axis during a twist lock operation.

3. The package for coiled welding wire according to claim 1, wherein the fixed core and the slip core have generally cylindrical shapes arranged along a common axis and the slip core is capable of telescopic movement along the common axis.

4. The package for coiled welding wire according to claim 3, wherein the slip core further comprises a wire holding device, the wire holding device applies a force to an end portion of the welding wire as the slip core is placed in the extended position, causing separation of one or more turns of the welding wire from remaining unseparated welding wire coiled within the annular space, and wherein the end portion of the welding wire within the wire holding device restricts rotational movement of the slip core relative to the fixed core when the slip core is located in the retracted position.

5. The package for coiled welding wire according to claim 4, wherein when the slip core is in the extended position, a top surface of the slip core is located at least 10-inches higher than a highest welding wire turn included in the remaining unseparated welding wire coiled within the annular space.

6. The package for coiled welding wire according to claim 1, wherein the locking mechanism is configured to prevent at least one of clockwise and counterclockwise rotation of the slip core relative to the fixed core when the slip core is in the extended position.

7. The package for coiled welding wire according to claim 6, wherein the locking mechanism includes a tab located on one of the slip core and the fixed core and the locking mechanism includes an aperture for receiving the tab located on the other one of the slip core and the fixed core.

8. The package for coiled welding wire according to claim 7, wherein the tab and the aperture comprise a twist lock, and wherein the tab is inserted into the aperture upon a rotational movement of the slip core.

9. The package for coiled welding wire according to claim 1, wherein one of the slip core and the fixed core defines a view hole that allows the other of the slip core and the fixed core to be viewed through the view hole when the slip core is in the extended position.

10. The package for coiled welding wire according to claim 1, wherein the slip core defines a first welding wire aperture and a second welding wire aperture and the fixed core defines a welding wire slot, each of the first welding wire aperture, the second welding wire aperture, and the welding wire slot are configured to enable an end portion of the welding wire to pass through the first welding wire aperture, the second welding wire aperture, and the welding wire slot to restrict rotational movement of the slip core relative to the fixed core when the slip core is located in the retracted position.

11. A package for coiled welding wire comprising:
an outer housing; and
a slip lift core within the outer housing,
wherein the outer housing and the slip lift core form an annular space for coiling a quantity of welding wire,
wherein the slip lift core provides a winding surface for the welding wire to be wound around the slip lift core in a series of turns,
wherein the slip lift core comprises a fixed core and a slip core capable of telescopic movement relative to the fixed core from a retracted position to an extended position, and
wherein the slip core includes a wire holding device that applies a force to an end portion of the welding wire as the slip core is placed in the extended position, causing separation of one or more turns of the welding wire from remaining unseparated welding wire coiled within the annular space.

12. The package for coiled welding wire according to claim 11, wherein the fixed core and the slip core have generally cylindrical shapes arranged along a common axis and the slip core is capable of telescopic movement along the common axis.

13. The package for coiled welding wire according to claim 11, wherein when the slip core is in the extended position, a top surface of the slip core is located at least 10-inches higher than a highest welding wire turn included in the remaining unseparated welding wire coiled within the annular space.

14. The package for coiled welding wire according to claim 11, wherein at least one of the fixed core and the slip core comprises a locking mechanism integrally formed with the at least one of the fixed core and the slip core, and the locking mechanism is configured to hold the slip core in the extended position, and
wherein the locking mechanism is a twist locking mechanism, and the slip core and the fixed core are arranged coaxially along an axis such that the telescopic movement of the slip core occurs along the axis, and the slip core is rotated around the axis during a twist lock operation.

15. The package for coiled welding wire according to claim 14, wherein the locking mechanism is configured to prevent at least one of clockwise and counterclockwise rotation of the slip core relative to the fixed core when the slip core is in the extended position.

16. The package for coiled welding wire according to claim 15, wherein the locking mechanism includes a tab located on one of the slip core and the fixed core and the locking mechanism includes an aperture for receiving the tab located on the other one of the slip core and the fixed core.

17. The package for coiled welding wire according to claim 11, wherein one of the slip core and the fixed core defines a view hole that allows the other of the slip core and the fixed core to be viewed through the view hole when the slip core is in the extended position.

18. The package for coiled welding wire according to claim 11, wherein the slip core defines a first welding wire aperture and a second welding wire aperture and the fixed core defines a welding wire slot, each of the first welding wire aperture, the second welding wire aperture, and the welding wire slot are configured to enable an end portion of the welding wire to pass through the first hole, the second hole, and the slot to restrict rotational movement of the slip core relative to the fixed core when the slip core is located in the retracted position.

19. A package for coiled welding wire comprising:
an outer drum;
a slip lift core within the outer drum, the outer drum and the slip lift core forming an annular space for coiling a quantity of welding wire, the slip lift core comprising:
a fixed core,
a slip core nested within the fixed core, wherein the slip core is capable of telescopic movement relative to the fixed core, from a retracted position to an extended position,
a twist lock including a tab on the slip core and an aperture defined by the fixed core for receiving the tab,
a view hole defined in the fixed core that allows the slip core to be viewed through the fixed core when the slip core is in the extended position, and
a wire holding device that applies a force to an end portion of the welding wire as the slip core is placed in the extended position, causing separation of one or more turns of the welding wire from remaining unseparated welding wire coiled within the annular space,
wherein the end portion of the welding wire within the wire holding device restricts rotational movement of the slip core relative to the fixed core when the slip core is located in the retracted position.

\* \* \* \* \*